United States Patent
Carlough et al.

(10) Patent No.: US 8,914,431 B2
(45) Date of Patent: Dec. 16, 2014

(54) RANGE CHECK BASED LOOKUP TABLES

(75) Inventors: Steven R. Carlough, Wappingers Falls, NY (US); Klaus M. Kroener, Ehningen (DE); Christophe J. Layer, Beoblingen (DE); Silvia Melitta Mueller, Altdorf (DE); Kerstin Schelm, Stuttgart (DE)

(73) Assignee: International Business Machines Corporation, Armonk, NY (US)

(*) Notice: Subject to any disclaimer, the term of this patent is extended or adjusted under 35 U.S.C. 154(b) by 418 days.

(21) Appl. No.: 13/342,232

(22) Filed: Jan. 3, 2012

(65) Prior Publication Data

US 2013/0173681 A1 Jul. 4, 2013

(51) Int. Cl.
G06F 7/38 (2006.01)

(52) U.S. Cl.
USPC .......................................... 708/605; 708/504

(58) Field of Classification Search
CPC . G06F 7/4873; G06F 7/5375; G06F 7/49936; G06F 7/49947; G06F 7/535; G06F 7/5525; G06F 7/4917
USPC ......................................... 708/504, 650–656
See application file for complete search history.

(56) References Cited

U.S. PATENT DOCUMENTS

| | | | | |
|---|---|---|---|---|
| 4,992,968 | A * | 2/1991 | Adiletta | 708/650 |
| 5,729,486 | A * | 3/1998 | Okada | 708/653 |
| 5,777,917 | A * | 7/1998 | Chung | 708/656 |
| 7,454,455 | B2 | 11/2008 | Ehrman | |
| 7,620,676 | B2 | 11/2009 | Okutani et al. | |
| 2005/0086279 | A1 | 4/2005 | Dhong et al. | |
| 2011/0231468 | A1 | 9/2011 | Amin et al. | |

OTHER PUBLICATIONS

Atkins, D.E., "Higher-radix Division Using Estimates of the Divisor and Partial Remainders", IEEE Trans. Computers, col. C-17, No. 10, Oct. 1968, pp. 925-934.
Bryant, Randal E. et al., "Bit-Level Analysis of an SRT Divider Circuit", Proceedings of the 33rd Desk Automation Conference, 1995, pp. 1-5.
Goldschmidt, Robert E., "Applications of Division by Convergence", Master of Science Thesis, Massachusetts Institute of Technology, Jun. 1964, 44 pages.
Harris, David L. et al., "SRT Division Architectures and Implementations", In Proceedings 13th IEEE Symposium on Computer Arithmetic, 1997, 8 pages.
Robertson, J.E., "A New Class of Digital Division Methods", IRE Trans. Electronic Computers, vol. EC-7, Sep. 1958, pp. 218-222.

(Continued)

Primary Examiner — Tan V. Mai
(74) Attorney, Agent, or Firm — Stephen J. Walder, Jr.; Parashos T. Kalaitzis (57) ABSTRACT

Mechanisms for utilizing a reduced lookup table circuit to perform an operation in a data processing device are provided. A first input value is input for selecting a subset of values from the reduced lookup table circuit. The reduced lookup table circuit stores only boundary cell values from a fully filled lookup table corresponding to the reduced lookup table circuit. The subset of values comprises only a subset of boundary cell values corresponding to the first input value. A second value is input and a comparison, by the reduced lookup table circuit, of the second value to each of the boundary cell values in the subset of boundary cell values is performed. The reduced lookup table circuit outputs an output value based on results of the comparison of the second value to each of the boundary cell values in the subset of boundary cell values.

15 Claims, 8 Drawing Sheets

(56) References Cited

OTHER PUBLICATIONS

Tan, K.G., "The Theory and Implementation of High-Radix Division", Proc. 4th IEEE Symp. Computer Arithmetic, Jun. 1978, pp. 154-163.

International Search Report and Written Opinion dated Apr. 8, 2013 for International Application No. PCT/EP2012/076634, 11 pages.

Pan, Tzu-Hsi et al., "High-Radix SRT Division with Speculation of Quotient Digits", 1995 IEEE International Conference on Computer Design: VLSI in Computers and Processors (ICCD '95), Oct. 2-4, 1995, p. 479-484.

U.S. Appl. No. 13/608,189, 1 page.

* cited by examiner

FROM FIG. 2A

| | | | | | | | | | | | | | | | | | |
|---|---|---|---|---|---|---|---|---|---|---|---|---|---|---|---|---|---|
| '0001.010 | 1 | 1 | 1 | 1 | 1 | 1 | 1 | 1 | 1 | 1 | 1 | 1 | 1 | 1 | 1 | 1 | 2/3 |
| '0001.001 | 1 | 1 | 1 | 1 | 1 | 1 | 1 | 1 | 1 | 1 | 1 | 1 | 1 | 1 | 1 | 1 | 240 |
| '0001.000 | 1 | 1 | 1 | 1 | 1 | 1 | 1 | 1 | 1 | 1 | 1 | 1 | 1 | 1.0 | 1.0 | | $X_1$ |
| '0000.111 | 1 | 1 | 1 | 1 | 1 | 1 | 1 | 1 | 1 | 1 | 1.0 | 1.0 | 1.0 | 1.0 | 1.0 | |
| '0000.110 | 1 | 1 | 1 | 1 | 1 | 1 | 1 | 1 | 1.0 | 1.0 | 1.0 | 1.0 | 1.0 | 1.0 | 1.0 | |
| '0000.101 | 1 | 1 | 1 | 1 | 1 | 1.0 | 1.0 | 1.0 | 1.0 | 1.0 | 1.0 | 1.0 | 1.0 | 0 | 0 | | 1/3 |
| '0000.100 | 1 | 1 | 1.0 | 1.0 | 1.0 | 1.0 | 1.0 | 1.0 | 0 | 0 | 0 | 0 | 0 | 0 | 0 | |
| '0000.011 | 1.0 | 1.0 | 0 | 0 | 0 | 0 | 0 | 0 | 0 | 0 | 0 | 0 | 0 | 0 | 0 | | 250 |
| '0000.010 | 0 | 0 | 0 | 0 | 0 | 0 | 0 | 0 | 0 | 0 | 0 | 0 | 0 | 0 | 0 | |
| '0000.001 | 0 | 0 | 0 | 0 | 0 | 0 | 0 | 0 | 0 | 0 | 0 | 0 | 0 | 0 | 0 | |
| '0000.000 | 0 | 0 | 0 | 0 | 0 | 0 | 0 | 0 | 0 | 0 | 0 | 0 | 0 | 0 | 0 | |
| P | 1.0000 | 1.0001 | 1.0010 | 1.0011 | 1.0100 | 1.0101 | 1.0110 | 1.0111 | 1.1000 | 1.1001 | 1.1010 | 1.1011 | 1.1100 | 1.1101 | 1.1110 | 1.1111 | D |
| P | 1.0000 | 1.0001 | 1.0010 | 1.0011 | 1.0100 | 1.0101 | 1.0110 | 1.0111 | 1.1000 | 1.1001 | 1.1010 | 1.1011 | 1.1100 | 1.1101 | 1.1110 | 1.1111 | D |
| '1111.111 | 0 | 0 | 0 | 0 | 0 | 0 | 0 | 0 | 0 | 0 | 0 | 0 | 0 | 0 | 0 | |
| '1111.110 | 0 | 0 | 0 | 0 | 0 | 0 | 0 | 0 | 0 | 0 | 0 | 0 | 0 | 0 | 0 | |
| '1111.101 | 0 | 0 | 0 | 0 | 0 | 0 | 0 | 0 | 0 | 0 | 0 | 0 | 0 | 0 | 0 | |
| '1111.100 | 0 | 0 | 0 | 0 | 0 | 0 | 0 | 0 | 0 | 0 | 0 | 0 | 0 | 0 | 0 | |
| '1111.011 | 1.0 | 1.0 | 0 | 0 | 0 | 0 | 0 | 0 | 0 | 0 | 0 | 0 | 0 | 0 | 0 | | 260 |
| '1111.010 | 1 | 1 | 1.0 | 1.0 | 1.0 | 1.0 | 1.0 | 1.0 | 0 | 0 | 0 | 0 | 0 | 0 | 0 | | -1/3 |
| '1111.001 | 1 | 1 | 1 | 1 | 1 | 1.0 | 1.0 | 1.0 | 1.0 | 1.0 | 1.0 | 1.0 | 1.0 | 0 | 0 | |
| '1111.000 | 1 | 1 | 1 | 1 | 1 | 1 | 1 | 1.0 | 1.0 | 1.0 | 1.0 | 1.0 | 1.0 | 1.0 | 1.0 | |
| '1110.111 | 1 | 1 | 1 | 1 | 1 | 1 | 1 | 1 | 1 | 1 | 1.0 | 1.0 | 1.0 | 1.0 | 1.0 | |
| '1110.110 | 1 | 1 | 1 | 1 | 1 | 1 | 1 | 1 | 1 | 1 | 1 | 1 | 1 | 1.0 | 1.0 | | $X_2$ |
| '1110.101 | 1 | 1 | 1 | 1 | 1 | 1 | 1 | 1 | 1 | 1 | 1 | 1 | 1 | 1 | 1 | | 270 |
| '1110.100 | 1 | 1 | 1 | 1 | 1 | 1 | 1 | 1 | 1 | 1 | 1 | 1 | 1 | 1 | 1 | | -2/3 |

TO FIG. 2C

FROM FIG. 2B

| | | | | | | | | | | | | | | | | |
|---|---|---|---|---|---|---|---|---|---|---|---|---|---|---|---|---|
| '1110.011 | 1 | 1 | 1 | 1 | 1 | 1 | 1 | 1 | 1 | 1 | 1 | 1 | 1 | 1 | 1 | |
| '1110.010 | 2 | 2.1 | 1 | 1 | 1 | 1 | 1 | 1 | 1 | 1 | 1 | 1 | 1 | 1 | 1 | |
| '1110.001 | 2 | 2 | 2.1 | 1 | 1 | 1 | 1 | 1 | 1 | 1 | 1 | 1 | 1 | 1 | 1 | |
| '1110.000 | 2 | 2 | 2 | 2 | 2.1 | 1 | 1 | 1 | 1 | 1 | 1 | 1 | 1 | 1 | 1 | |
| '1101.111 | 2 | 2 | 2 | 2 | 2 | 2.1 | 1 | 1 | 1 | 1 | 1 | 1 | 1 | 1 | 1 | |
| '1101.110 | 2 | 2 | 2 | 2 | 2 | 2 | 2.1 | 2.1 | 1 | 1 | 1 | 1 | 1 | 1 | 1 | |
| '1101.101 | 2 | 2 | 2 | 2 | 2 | 2 | 2 | 2.1 | 2.1 | 1 | 1 | 1 | 1 | 1 | 1 | |
| '1101.100 | 2 | 2 | 2 | 2 | 2 | 2 | 2 | 2 | 2.1 | 2.1 | 2.1 | 1 | 1 | 1 | 1 | |
| '1101.011 | 2 | 2 | 2 | 2 | 2 | 2 | 2 | 2 | 2 | 2.1 | 2.1 | 1 | 1 | 1 | 1 | 280 |
| '1101.010 | 2 | 2 | 2 | 2 | 2 | 2 | 2 | 2 | 2 | 2 | 2.1 | 2.1 | 2.1 | 1 | 1 | -4/3 |
| '1101.001 | 2 | 2 | 2 | 2 | 2 | 2 | 2 | 2 | 2 | 2 | 2 | 2.1 | 2.1 | 2.1 | 1 | |
| '1101.000 | 2 | 2 | 2 | 2 | 2 | 2 | 2 | 2 | 2 | 2 | 2 | 2 | 2.1 | 2.1 | 2.1 | |
| '1100.111 | 2.1.0 | 2 | 2 | 2 | 2 | 2 | 2 | 2 | 2 | 2 | 2 | 2 | 2 | 2.1 | 2.1 | |
| '1100.110 | 2.1.0 | 2.1.0 | 2 | 2 | 2 | 2 | 2 | 2 | 2 | 2 | 2 | 2 | 2 | 2 | 2 | $x_3$ |
| '1100.101 | 2.1.0 | 2.1.0 | 2 | 2 | 2 | 2 | 2 | 2 | 2 | 2 | 2 | 2 | 2 | 2 | 2 | 290 |
| '1100.100 | 2.1.0 | 2.1.0 | 2.1.0 | 2 | 2 | 2 | 2 | 2 | 2 | 2 | 2 | 2 | 2 | 2 | 2 | -5/3 |
| '1100.011 | 2.1.0 | 2.1.0 | 2.1.0 | 2.1.0 | 2 | 2 | 2 | 2 | 2 | 2 | 2 | 2 | 2 | 2 | 2 | |
| '1100.010 | 2.1.0 | 2.1.0 | 2.1.0 | 2.1.0 | 2.1.0 | 2 | 2 | 2 | 2 | 2 | 2 | 2 | 2 | 2 | 2 | |
| '1100.001 | 2.1.0 | 2.1.0 | 2.1.0 | 2.1.0 | 2.1.0 | 2 | 2 | 2 | 2 | 2 | 2 | 2 | 2 | 2 | 2 | |
| '1100.000 | 2.1.0 | 2.1.0 | 2.1.0 | 2.1.0 | 2.1.0 | 2.1.0 | 2 | 2 | 2 | 2 | 2 | 2 | 2 | 2 | 2 | |
| '1011.111 | 2.1.0 | 2.1.0 | 2.1.0 | 2.1.0 | 2.1.0 | 2.1.0 | 2 | 2 | 2 | 2 | 2 | 2 | 2 | 2 | 2 | |
| '1011.110 | 2.1.0 | 2.1.0 | 2.1.0 | 2.1.0 | 2.1.0 | 2.1.0 | 2.1.0 | 2 | 2 | 2 | 2 | 2 | 2 | 2 | 2 | |
| '1011.101 | 2.1.0 | 2.1.0 | 2.1.0 | 2.1.0 | 2.1.0 | 2.1.0 | 2.1.0 | 2 | 2 | 2 | 2 | 2 | 2 | 2 | 2 | |
| '1011.100 | 2.1.0 | 2.1.0 | 2.1.0 | 2.1.0 | 2.1.0 | 2.1.0 | 2.1.0 | 2 | 2 | 2 | 2 | 2 | 2 | 2 | 2 | |
| '1011.011 | 2.1.0 | 2.1.0 | 2.1.0 | 2.1.0 | 2.1.0 | 2.1.0 | 2.1.0 | 2.1.0 | 2.1.0 | 2 | 2 | 2 | 2 | 2 | 2 | |
| '1011.010 | 2.1.0 | 2.1.0 | 2.1.0 | 2.1.0 | 2.1.0 | 2.1.0 | 2.1.0 | 2.1.0 | 2.1.0 | 2 | 2 | 2 | 2 | 2 | 2 | |
| '1011.001 | 2.1.0 | 2.1.0 | 2.1.0 | 2.1.0 | 2.1.0 | 2.1.0 | 2.1.0 | 2.1.0 | 2.1.0 | 2 | 2 | 2 | 2 | 2 | 2 | |
| '1011.000 | 2.1.0 | 2.1.0 | 2.1.0 | 2.1.0 | 2.1.0 | 2.1.0 | 2.1.0 | 2.1.0 | 2.1.0 | 2.1.0 | 2 | 2 | 2 | 2 | 2 | |
| '1010.111 | 2.1.0 | 2.1.0 | 2.1.0 | 2.1.0 | 2.1.0 | 2.1.0 | 2.1.0 | 2.1.0 | 2.1.0 | 2.1.0 | 2.1.0 | 2 | 2 | 2 | 2 | |
| '1010.110 | 2.1.0 | 2.1.0 | 2.1.0 | 2.1.0 | 2.1.0 | 2.1.0 | 2.1.0 | 2.1.0 | 2.1.0 | 2.1.0 | 2.1.0 | 2 | 2 | 2 | 2 | |
| '1010.101 | 2.1.0 | 2.1.0 | 2.1.0 | 2.1.0 | 2.1.0 | 2.1.0 | 2.1.0 | 2.1.0 | 2.1.0 | 2.1.0 | 2.1.0 | 2.1.0 | 2 | 2 | 2 | |
| '1010.100 | 2.1.0 | 2.1.0 | 2.1.0 | 2.1.0 | 2.1.0 | 2.1.0 | 2.1.0 | 2.1.0 | 2.1.0 | 2.1.0 | 2.1.0 | 2.1.0 | 2.1.0 | 2 | 2 | -8/3 |
| '1010.011 | 2.1.0 | 2.1.0 | 2.1.0 | 2.1.0 | 2.1.0 | 2.1.0 | 2.1.0 | 2.1.0 | 2.1.0 | 2.1.0 | 2.1.0 | 2.1.0 | 2.1.0 | 2.1.0 | 2.1.0 | |

RANGE CHECK BASED LOOKUP TABLES

BACKGROUND

The present application relates generally to an improved data processing apparatus and method and more specifically to mechanisms for providing and utilizing range check based lookup table structures in a data processing system.

Division, reciprocal, square root, approximations, and other arithmetic operations are used in critical applications and impact the performance of a data processing unit. This is especially true of integer divisions which are relevant in the JAVA, C++, and Oracle programming languages. Integer division is typically used for fast hashing in many current software routines.

A predominant and fast divide algorithm currently available is SRT based division (named for its creators, Sweeney, Robertson, and Tocher). SRT division is a popular method for division in many microprocessor implementations. SRT division is similar to non-restoring division, but SRT division uses a lookup table based on the dividend and the divisor to determine each quotient digit. The SRT division algorithm is an adequate algorithm for fast division operations, but requires a very large lookup table (LUT), and thus a large chip area, which constrains or limits the speed of the chip design. For high frequency processors, such as the IBM z-Series and POWER series chip designs, available from International Business Machines Corporation of Armonk, N.Y., a standard SRT algorithm is not a suitable solution because the time required to access the large LUT results in a hardware solution that does not meet the specified target cycle time for the processor

SUMMARY

In one illustrative embodiment, a method, in a data processing device, for utilizing a reduced lookup table circuit to perform an operation in the data processing device. The method comprises inputting a first input value to the reduced lookup table circuit for selecting a subset of values from the reduced lookup table circuit. The reduced lookup table circuit stores only boundary cell values from a fully filled lookup table corresponding to the reduced lookup table circuit. The subset of values comprises only a subset of boundary cell values corresponding to the first input value. The method further comprises inputting a second value to the reduced lookup table circuit and comparing, by the reduced lookup table circuit, the second value to each of the boundary cell values in the subset of boundary cell values. The method also comprises outputting, by the reduced lookup table circuit, an output value based on results of the comparison of the second value to each of the boundary cell values in the subset of boundary cell values.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIGS. 2A-2C illustrate an example diagram of a lookup table for outputting a quotient guess for an SRT division operation;

DETAILED DESCRIPTION

The illustrative embodiments provide a mechanism for providing range check based lookup table mechanisms for use in data processing systems. In some illustrative embodiments, the range check based lookup table mechanism may be used with SRT mechanisms. The mechanisms of the illustrative embodiments allow a relatively smaller lookup table size to be used for quotient digit guesses in the SRT mechanisms, however the mechanisms of the illustrative embodiments may be used with any lookup table (LUT) with sorted data organization where the data is organized into areas of the LUT defined by ranges of values. Other advantages of the illustrative embodiments will be addressed below or will become apparent in view of the following detailed description.

The speed of any given division operation is bounded by two factors: the number of iterations necessary to complete the operation, and how long each iteration takes to complete. Multiplication based algorithms for performing division operations, such as Newton-Raphson or Goldschmidt-Powers algorithms, converge to a solution with relatively fewer iterations than Additive algorithms for performing division operations. However, each iteration requires significantly more computation than a simple addition implementation would. In high frequency processors, more than 1 clock cycle is often required per iteration.

Addition based algorithms for performing division operations, such as SRT, require more iterations to complete than multiplicative algorithms, but each iteration is typically completed in 1 cycle. Depending on the frequency of the processor clock in which the algorithm is implemented, it is often possible to compute more than one quotient digit per processor cycle. The lower the clock frequency of the processor, the longer each iteration takes to complete but the easier it is to compute more bits of the result per processor cycle. For example, known algorithms such as SRT radix-4 computes 2 bits of the result per processor cycle. Radix-16 SRT algorithms compute 4 bits per processor cycle but require large lookup tables and are typically difficult to fit into a faster processor cycle time. For example, Intel Corporation Nehalem/Westmere processors have a very difficult time getting radix-16 SRT divide operations to fit into their processor cycle due to the large radix-16 lookup table (LUT). While these Intel Corporation processors are able to perform radix-16 SRT divide operations in a single processor cycle, it was only able to be done by cascading two radix-4 SRT engines and using special registers.

In addition to the above drawbacks, multiplication based mechanisms for performing divide operations require the use of a large and expensive (in terms of chip area, power, and the like) multiplier. These multiplication based mechanisms further eventually require the ability to perform fused multiply and add (FMA) operations. The issues with requiring a FMA operation is that, when implemented within a processor pipeline, the length of the pipeline influences the throughput and the pipeline cannot be used for other instructions. Due to the length of the FMA pipeline, the latency of the FMA pipeline is usually higher than SRT based algorithms.

Addition based mechanisms, such as SRT, require a lookup table (LUT) to determine quotient digits. Depending on the actual implementation, the size of the LUT is determined by several different parameters and higher radix mechanisms cause the LUT to become very large. Furthermore, the size of the LUT has an impact on the timing and thus, limits the speed of the processor and may be prone to implementation errors.

The illustrative embodiments take advantage of the mathematical properties of the LUT in order to provide the same result as a fully filled LUT with direct access but using a smaller size LUT than that of the fully filled LUT. This is done by storing only the portions of the LUT corresponding to range boundaries. The resulting LUT in the illustrative embodiments may be approximately 20 times smaller for radix-16 SRT mechanisms than state of the art implementations. This enables faster circuit logic due to shorter paths. Furthermore, the illustrative embodiments allow for a natural separation of the initialization processor cycle, in which the smaller sized LUT is addressed once based on the divisor of the division (also referred to as the preprocessing step) and a lookup processor cycle (also referred to as the iteration step), in which the previously stored range boundaries are compared to the input value, replacing the actual large table lookup as known in state of the art solutions. Compared to these known solutions where this input value is used together with the divisor of the division to address the huge LUT at each iteration step, the moving of some of the computing related to the LUT outside of the iteration step into the preprocessing step, allows a reduction of the amount of circuit logic necessary in the iteration step to implement the SRT algorithm.

The illustrative embodiments will be described hereafter with regard to their use with the SRT division algorithm and circuit logic. It should be appreciated, however, that the mechanisms of the illustrative embodiments are not limited to such. Rather, the lookup table (LUT) mechanisms of the illustrative embodiments may be used with any mechanism in which a LUT having sorted data organization is utilized.

The SRT division algorithm is an iterative algorithm similar to non-restoring division. The SRT division algorithm is a well known algorithm and thus, a more detailed description is not presented herein except to the level necessary to understand the improvements made by the present invention to the LUT mechanism used with the SRT division algorithm. The SRT division algorithm is described in various documents including J. E. Robertson, "A New Class of Digital Division Methods," IRE Trans. Electronic Computers, vol. EC-7, pp. 218-222, September 1958; K. D. Tocher, "Techniques of Multiplication and Division for Automatic Binary Computers," Quart. J. Mech. Appl. Math., vol. 11, pt. 3, pp. 364-368, 1958; D. E. Atkins, "Higher-radix Division Using Estimates of the Divisor and Partial Remainders," IEEE Trans. Computers, vol. C-17, no. 10, October 1968; and K. G. Tan, "The Theory and Implementation of High-Radix Division," in Proc. $4^{th}$ IEEE Symp. Computer Arithmetic, pp. 154-163, June 1978.

Implementations of the SRT division algorithm utilize a LUT mechanism which, based on the dividend and the divisor, is used to determine each quotient digit. The iteration SRT function for calculating the partial remainder is:

$$P(i+1)=r*P(i)-q(i+1)*D$$

where i is the iteration step, r is the radix (usually 2, 4, 8, 10, or 16), P(i) is the partial remainder, D is the denominator, and q(i+1) is the guessed quotient (Note that the quotient digit q(i+1)=LUT{P(i), D}). The iteration SRT function essentially computes the next partial remainder P(i+1) based on a quotient guess q(i+1) and the current partial remainder P(i).

Figure 1:
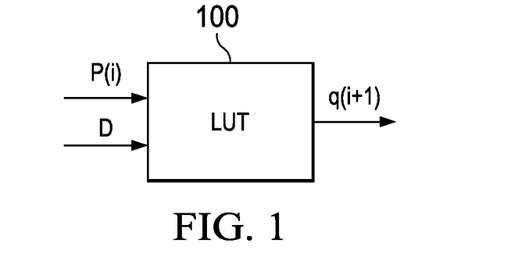
FIG. 1 is an example diagram that illustrates the use of a LUT to generate a guessed quotient $q(i+1)$.

FIG. 1 illustrates the use of a LUT to generate a guessed quotient q(i+1). As shown in FIG. 1, the partial remainder P(i) and the constant denominator D are input to the LUT 100 to perform a lookup operation that outputs a guessed quotient q(i+1). Thus, the LUT 100 is also sometimes referred to as a PD-table or PD-plot. The guessed quotient q(i+1) is output to remaining circuit elements that are used to implement the SRT algorithm mechanism, e.g., an input register to an adder circuit that adds the partial remainder and the product of the quotient guess and the constant denominator, or divisor, D.

The size of the LUT 100 equals the amount of sub-divisions in the partial remainder P(i) and the denominator D. For example, for a LUT with radix r=4, P with 128 sub-divisions, and D with 16 sub-divisions, if the quotient guesses are integers within the set {−2, −1, 0, 1, 2}, and the q(i+1) values are coded using 3 bits, the size of the LUT is then 16*128*3=6144 bits. Thus, the LUT 100 may represent a significant size in an integrated circuit design taking up a relatively large amount of chip area and consuming a relatively large amount of power in operation.

Figure 2A:
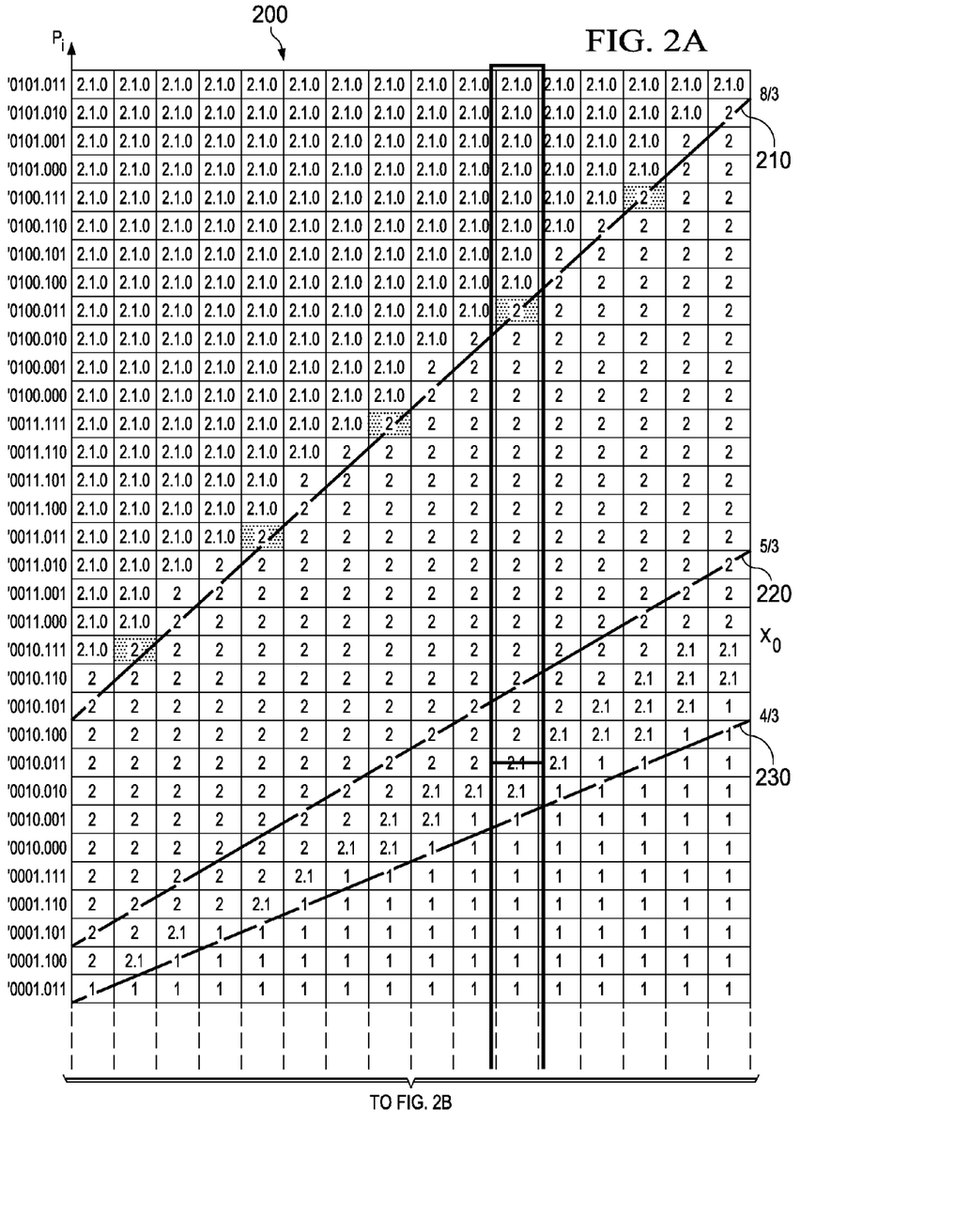
Figure 2B:
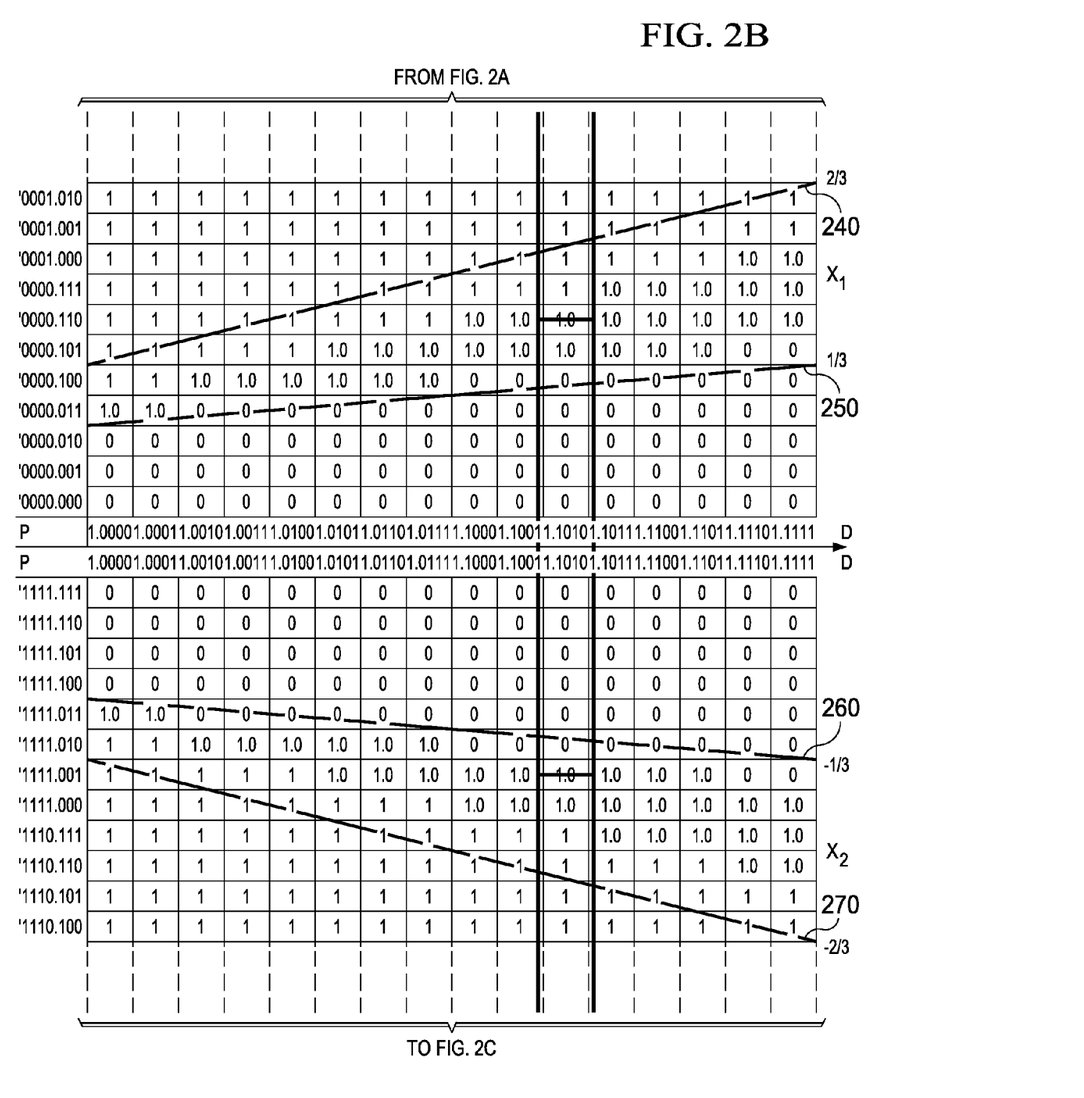

FIGS. 2A-2C illustrate an example diagram of a lookup table that may be implemented by the LUT mechanism 100 of FIG. 1, for example. As shown in FIGS. 2A-2C, each row of the SRT lookup table 200 corresponds to a different partial remainder P, while each column of the SRT lookup table 200 corresponds to a different denominator D. At each cell of the SRT lookup table 200 for a particular P, D pair, a corresponding quotient values is stored, e.g., 0, 1, 2, etc. Thus, for example, a cell value of "0" means that for that particular P(i) and D, a quotient guess q(i+1) of 0 is output. For a cell whose value is "1, 0" the particular P(i) and D results in a quotient guess q(i+1) of either 1 or 0. It does not matter which of 0 or 1 is chosen, as long as both 1 and 0 are acceptable for the algorithm (e.g., as long as the convergence criteria of the SRT algorithm is respected).

As can be seen from FIGS. 2A-2C, there is a definite pattern of values denoted by the areas between the dark border lines 210-250. These borders 210-250 represent a set of cells and corresponding P, D values where the set of quotient values below this border is at most one quotient value, e.g., line 230 below which the quotient values are at most 1, or where the set of quotient values above this border is at least one quotient value, e.g., line 240 where the quotient values are at least 1. Thus, for a particular D value in the SRT lookup table 200, there are P values at which the adjacent P values have different quotient guess q(i+1) values. For example, for a D value of 1.1110, the partial remainder P(i)=0000.101 is a possible border P value since P(i)=0000.100 has a quotient guess of 0 and P(i)=0000.110 has a quotient guess of 1,0 (it should be noted that i in the context of P(i) is an index related to the iteration step, not to the value P and thus, P(i+1) is the value of P at the iteration (i+1)). Thus, in the SRT lookup table 200, for each column corresponding to each D value, there are 4 border P values, 2 on the positive P side and 2 on the −P side. The borders are chosen between the highest and the lowest values of P for which a given q(i+1)=k is set.

It is further noted that for all iterations of the SRT mechanism, the D value is kept constant, i.e. D is the normalized divisor of the SRT division. Looking again at the SRT function for calculating the partial remainder set forth above, it is shown that the D value remains constant even though the iteration value i may change as does the P(i) and q(i+1) values. Since D remains constant for all iterations, the quotient guesses q(i+1) are all taken from the same column of the SRT lookup table 200. Furthermore, the SRT lookup table 200 has the properties that for a given D value:

if $P1(i) >= P2(i)$, then $q1(i) >= q2(i)$ if $P1(i) <= P2(i)$, then $q1(i) <= q2(i)$ where i is the iteration value and the indices 1 and 2 are any two possible values for P(i). In other words, if a first border P value, i.e. $P1(i)$, is greater than or equal to a second border P value, i.e. $P2(i)$, then their quotient guess values $q1(i)$ and $q2(i)$, respectively, are likewise related such that $q1(i)$ is greater than or equal to the $q2(i)$ value.

Because of these properties, it can be seen that it is not necessary to store all of the values of the SRT lookup table 200 in memory but that it suffices to store only the boundary values of P for which the adjacent q(i+1) changes. Thus, it is possible to compare the input value of P(i) to the stored boundary P values of the SRT lookup table 200 to determine which quotient value to select.

In the depicted example, 4 values of P, with 7 bits each, may be stored for each of the 16 columns of the SRT lookup table 200 in order to denote the boundary P values. There are 4 range boundary values because, in the depicted example, the digit set includes 5 possible values for the q(i+1) digits, i.e. {−2, −1, 0, +1, +2}. This gives a size of the new lookup table (LUT) of Size=4 values*7 bits*16 columns=448 bits. This is a reduction factor of 13.7, i.e. the new LUT has a size that is only 7.3% of the size of the original fully filled LUT. After compression of this new LUT, the new LUT can be reduced to approximately 62 entries which is a reduction factor of 99, i.e. the new compressed LUT has a size that is only 1% of the size of the original fully filled LUT.

The illustrative embodiments provide a mechanism for utilizing the new LUT or new compressed LUT in which only the range border cells for each column of the LUT are stored, to perform a lookup of an output value. With one illustrative embodiment, the new LUT or new compressed LUT is used to output a quotient guess q(i+1) based on the input of current partial remainder P(i) and a constant denominator or divisor D. The lookup operation is made more efficient than known lookup operations in that it utilizes a smaller LUT, utilizes less power, and increases the speed of the lookup operation due to the smaller size of the LUT.

Figure 3:
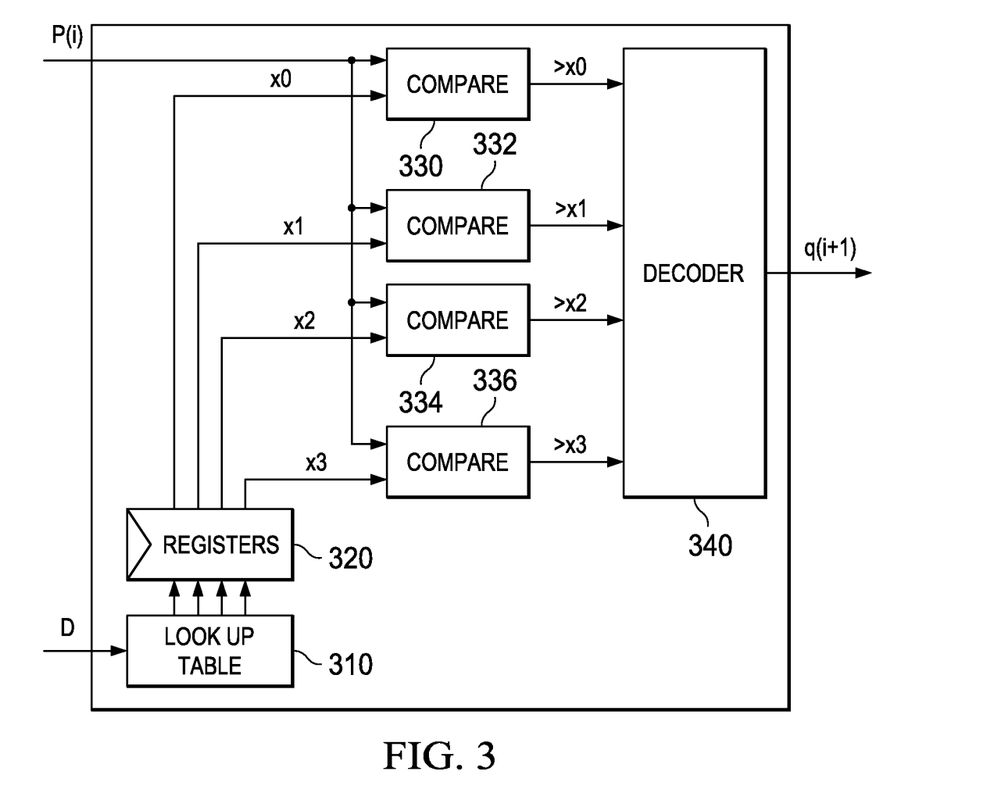
FIG. 3 is an example diagram illustrating one circuit implementation of a lookup table mechanism in accordance with one illustrative embodiment.

FIG. 3 is an example diagram illustrating one circuit implementation of a lookup table mechanism in accordance with one illustrative embodiment. As shown in FIG. 3, the constant divisor or denominator D is input to the new reduced size LUT 310 which only stores the partial remainder values of the border cells for each of the columns of the original fully filled LUT that correspond to the various D values. Thus, with a radix 4 SRT algorithm, the LUT stores the four border cell partial remainder values. As a result of the input of the D value into the LUT 310, the LUT 310 outputs the four border cell partial remainder values x0 to x3 to registers 320, where x0 is a border cell which is chosen between the lines 220 and 230, x1 is a border cell which is chosen between the lines 240 and 250, x2 is a border cell which is chosen between the lines 260 and 270, and x3 is a border cell which is chosen between the lines 280 and 290.

Each of the border cell partial remainder values is input to a corresponding comparator 330-336. Also input to each of the comparators 330-336 is the current partial remainder P(i) for the current iteration of the SRT division algorithm. The comparators 330-336 compare the current partial remainder P(i) to the corresponding border cell partial remainder value x0 to x3 to determine if the border cell partial remainder value x0 to x3 is greater than the border cell partial remainder value x0 to x3. If so, the comparator outputs a value indicative of the current partial remainder P(i) being greater than the corresponding border cell partial remainder value x0, x1, x2, or x3. The result is a vector input to the decoder 340 where the vector input in the depicted example comprises four values, each value indicative of whether or not the partial remainder P(i) is greater than a corresponding border cell partial remainder value x0, x1, x2, or x3.

In the depicted example, it is known that x0>x1>x2>x3. Therefore, it suffices in the decoder 340 to detect in the vector input, for which two consecutive values in the vector, the comparator outputs are [0, 1]. For example, if the value output from comparator 330 is a 0 and the output from comparator 332 is a 1, then it is known that the current partial remainder is not greater than the border cell partial remainder value x0 but is greater than the border cell partial remainder value x1. Thus, the partial remainder P(i) is in the range between x1 and x0.

The decoder 340 determines which range the current partial remainder P(i) is present in based on the various comparisons made by the comparators 330-336 and based on the range that the current partial remainder P(i) is in, a corresponding quotient guess q(i+1) is output by the decoder 340. In one illustrative embodiment, the quotient guess q(i+1) is output by the decoder 340 based on the 4 boundaries and thus, the decoder outputs one of 5 choices for q(i+1), i.e. {2, 1, 0, −1, −2}.

For example, using the example LUT shown in FIGS. 2A-2C, if all of the values output by the comparators 330-336 are 1, then the current partial remainder P(i) is in the upper range of the LUT, i.e. the portion of the LUT where the cells have quotient guess values of 2 or "0,1,2", and thus, the value 2 is output as a quotient guess q(i+1). If all of the outputs from the comparators 330-336 are 0, then the current partial remainder P(i) is at a lowest range of the LUT, i.e. the portion of the LUT where the cells have quotient guess values of 2 or "−2, −1, 0", and thus, the values −2 is output as a quotient guess q(i+1). If comparator 330 outputs a 0 and comparator 332 outputs a 1, then the current partial remainder P(i) is in the range between x0 and x1 in FIGS. 2A-2C and the quotient guess is 1. If the comparator 330 outputs a 0, comparator 332 outputs a 0, and comparator 334 outputs a 1, then the current partial remainder P(i) is in the range between x2 and x1, i.e. the area x1 in FIG. 2 FIGS. 2A-2C and the quotient guess q(i+1) that is output is a 0. If the comparator 330 outputs a 0, comparator 332 outputs a 0, comparator 334 outputs a 0, and comparator 336 outputs a 1, then the current partial remainder P(i) is in the range between x2 and x3, i.e. the area x2 in FIGS. 2A-2C, and thus, the quotient guess q(i+1) is a −1 value.

Thus, with the mechanisms of the illustrative embodiments, a smaller LUT is able to be used that stores, for each denominator or divisor value D, the boundary partial remainder P(i) values where the output value from the LUT changes from one value to another, e.g., the quotient guess q(i+1) changes from one value to another. This greatly reduces the size of the LUT when compared to a fully filled LUT that stores all of the output values for all combinations of partial remainder P(i) and denominator/divisor D. The current partial remainder P(i) for the current iteration of the algorithm, e.g., the SRT division algorithm, is compared to these stored boundary partial remainder P(i) values to determine a range of the LUT in which the partial remainder P(i) falls and thus, the corresponding correct output value for the LUT, e.g., the correct quotient guess q(i+1) output value.

Figure 4:
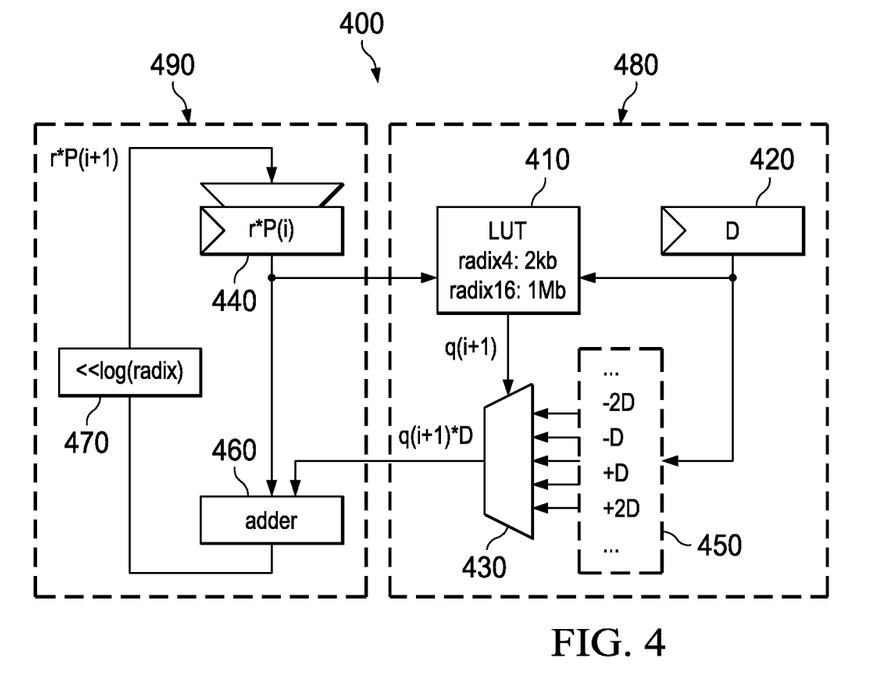
FIG. 4 is an example diagram of a SRT division circuit utilizing a reduced size LUT mechanism in accordance with one illustrative embodiment.

As discussed above, the LUT mechanisms of the illustrative embodiments, such as shown in FIG. 3, for example, may be utilized with circuitry for implementing a SRT algorithm. FIG. 4 is an example diagram of a SRT division circuit utilizing a reduced size LUT mechanism in accordance with one illustrative embodiment.

As shown in FIG. 4, the reduced size LUT 410 is coupled to an input register 420 for receiving the denominator or divisor D. The value of D is set at initialization of the SRT division circuit 400 for performing a SRT division operation. The LUT 410 is further coupled to multiplexer 430 and partial remainder P(i) register 440 (which is shown with a multiplexer for purposes of initialization before the SRT division operation iteration begins). The LUT 410 may be a LUT mechanism such as shown in FIG. 3 above. For a radix 4 SRT division algorithm, the LUT 410 may have a size, for example, of approximately 2 kb. For a radix 16 SRT division algorithm, the LUT 410 may have a size, for example, of approximately 1 Mb.

The LUT 410 receives both the D value from register 420 and the partial remainder P(i) for the current iteration from the partial remainder register 440. The LUT 410 outputs a quotient guess q(i+1) to multiplexer 430 as a control input. The output from the LUT 410, i.e. quotient guess q(i+1), may be used to select one of the inputs to the multiplexer 430, e.g., −2D, −D, +D, +2D, or 0 (these correspond to the quotient guess q(i+1)*D in this example). These values may be stored in an input register 450 to the multiplexer 430. Alternatively, rather than using multiplexer 430 and register 450, the output from the LUT 410 may be input to a multiplier that multiplies the output from the LUT 410 with the D value from input register 420.

The resulting output, q(i+1)*D, either from the multiplexer 430, a multiplier (not shown), or the like, is input to an adder circuit 460 along with the partial remainder P(i) for the current iteration. The adder circuit 460 adds the product of the quotient guess q(i+1) and the divisor D to the partial remainder P(i) and outputs the result multiplied by the radix r, i.e. shifted left by log(r). Shifter 470 performs the multiplication with r by shifting left by log(r). While shifter 470 is shown as being after latch 440, in other illustrative embodiments, the shifter 470 may be placed elsewhere in the circuit, such as before latch 440. The shifter 470, in one illustrative embodiment, is a constant shift logic element, i.e. no logic gates involved but instead uses a hardwired bit mapping, although in other illustrative embodiments logic gates may be utilized.

The example SRT division mechanism shown in FIG. 4 iteratively computes a final remainder, but the primary output is the quotient digits guessed from the LUT 410 at each iteration. Each SRT iteration basically computes P(i+1)=r*P(i)−q(i+1)*D. Hence LUT 410 guesses q(i+1) based on P(i) and D. The multiplexer 430 generates q(i+1)*D based on shifted versions of D from register 450. Adder 460 computes r*P(i)−q(i+1)*D. Shifter 470 performs the multiplication with r by shifting left of log(r).

Figure 5A:
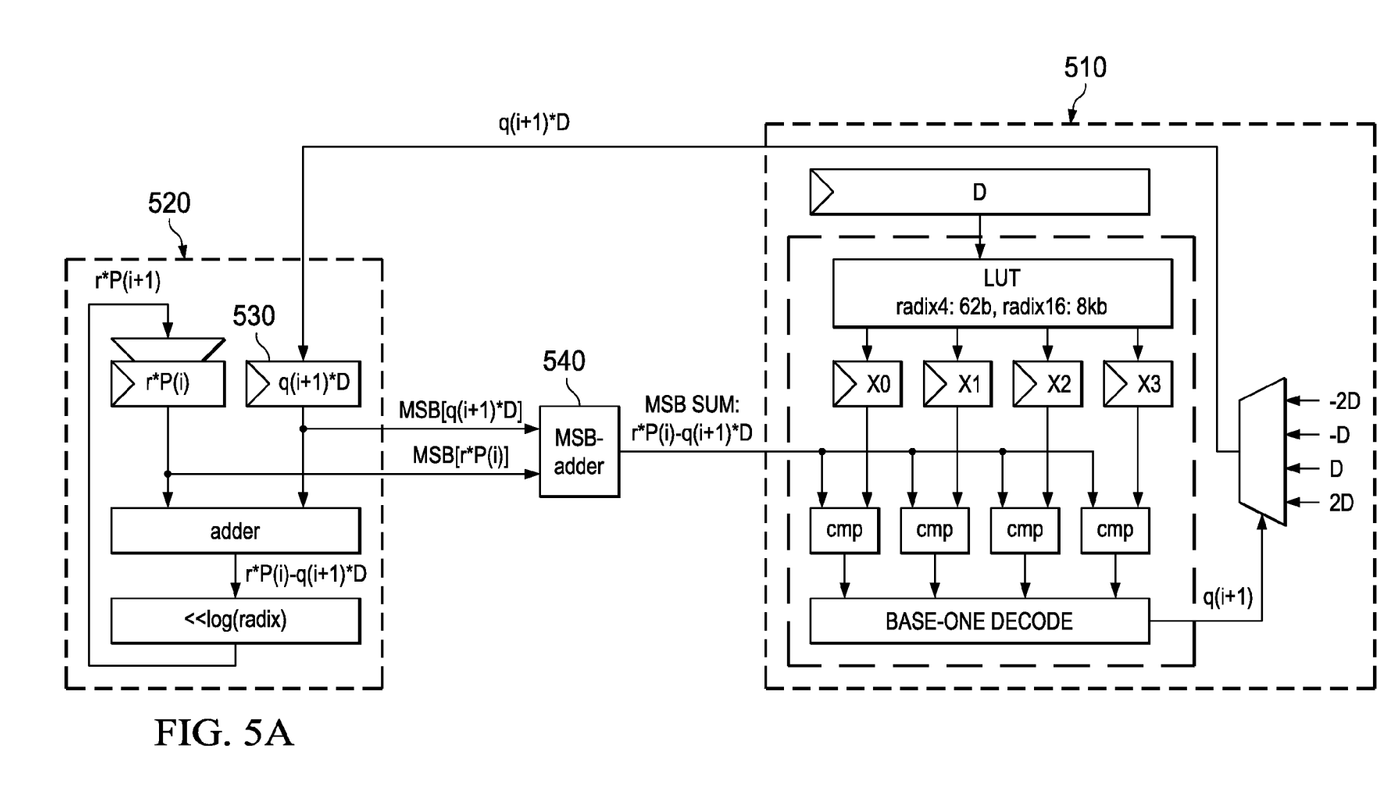
FIG. 5A is an example diagram of a SRT division circuit utilizing a most significant bits (MSB) adder and the reduced size LUT mechanism in accordance with one illustrative embodiment.

FIG. 5A is an example diagram of a SRT division circuit utilizing a most significant bits (MSB) adder and the reduced size LUT mechanism in accordance with one illustrative embodiment. As shown in FIG. 5A, portion 510 of the circuit computes a same result as portion 480 of FIG. 4 and portion 520 of FIG. 5A computes a same result as portion 490 of FIG. 4, however the registers in these portions of FIG. 5A do not have the same values as those of FIG. 4. A primary difference between FIG. 5A and FIG. 4 is the use of the register 530 for storing the product of the quotient guess q(i+1) and the divisor D, and the use of the most significant bits (MSB) adder circuit 540 which takes the most significant bits of the input registers 420 and 440 as input and outputs a MSB sum of r*P(i)−q(i+1)*D. The output from the MSB adder circuit 540 is input to the comparators of the LUT mechanism in portion 510 for comparison with the outputs from the LUT.

Figure 5B:
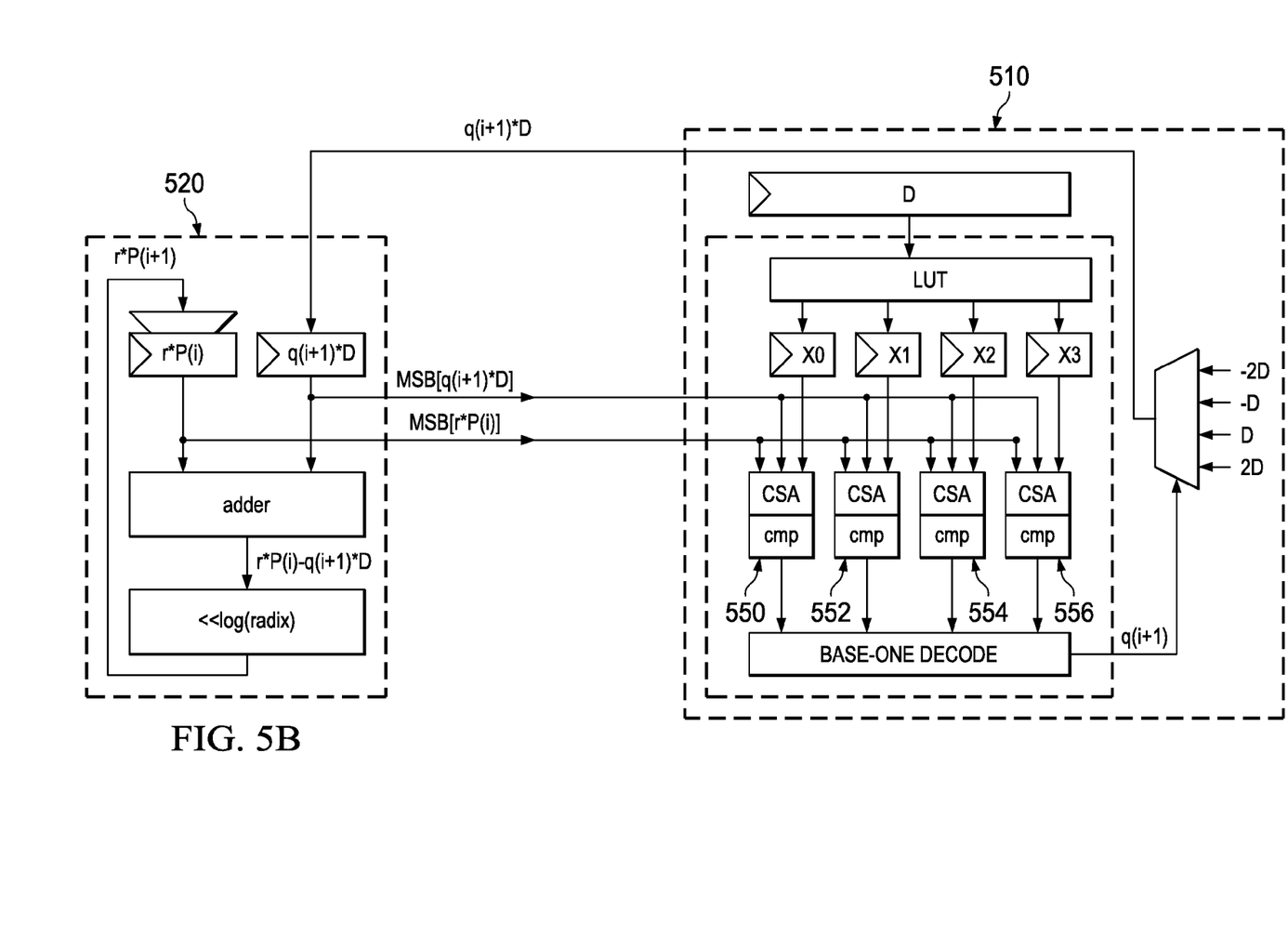
FIG. 5B is an example diagram of a SRT division circuit utilizing a reduced size LUT mechanism and CSA mechanisms in accordance with another illustrative embodiment.

FIG. 5B is an example diagram of a SRT division circuit utilizing a reduced size LUT mechanism and carry save adder (CSA) mechanisms in accordance with another illustrative embodiment. The carry save adders (CSA) elements 550-556 of this embodiment is a fast and redundant form of adder using a sum and a carry vector as output of the addition. The MSB adder circuit 540 of the embodiment in FIG. 5A outputs a single fully resolved result vector, whereas the carry save adder generates sum and carry vectors as output.

As shown in FIG. 5B, when compared to the embodiment in FIG. 5A, the MSB adder circuit 540 is eliminated. Furthermore, r*P(i) register and q(i+1)*D register output their most significant bits (MSB), which together represent the MSB sum r*P(i)−q(i+1)*D, to the CSA elements 550-556 that are coupled to the comparators of the LUT mechanism. The use of the CSA elements 550-556 reduce the length of the critical path when compared to the circuit arrangement shown in FIG. 5A by saving the MSB adder which is a full adder.

FIGS. 5A and 5B are only example diagrams of example configurations of a SRT division circuit in accordance with illustrative embodiments. Other types of circuits having other types of elements and configurations of elements may be used without departing from the spirit and scope of the illustrative embodiments.

Figure 6:
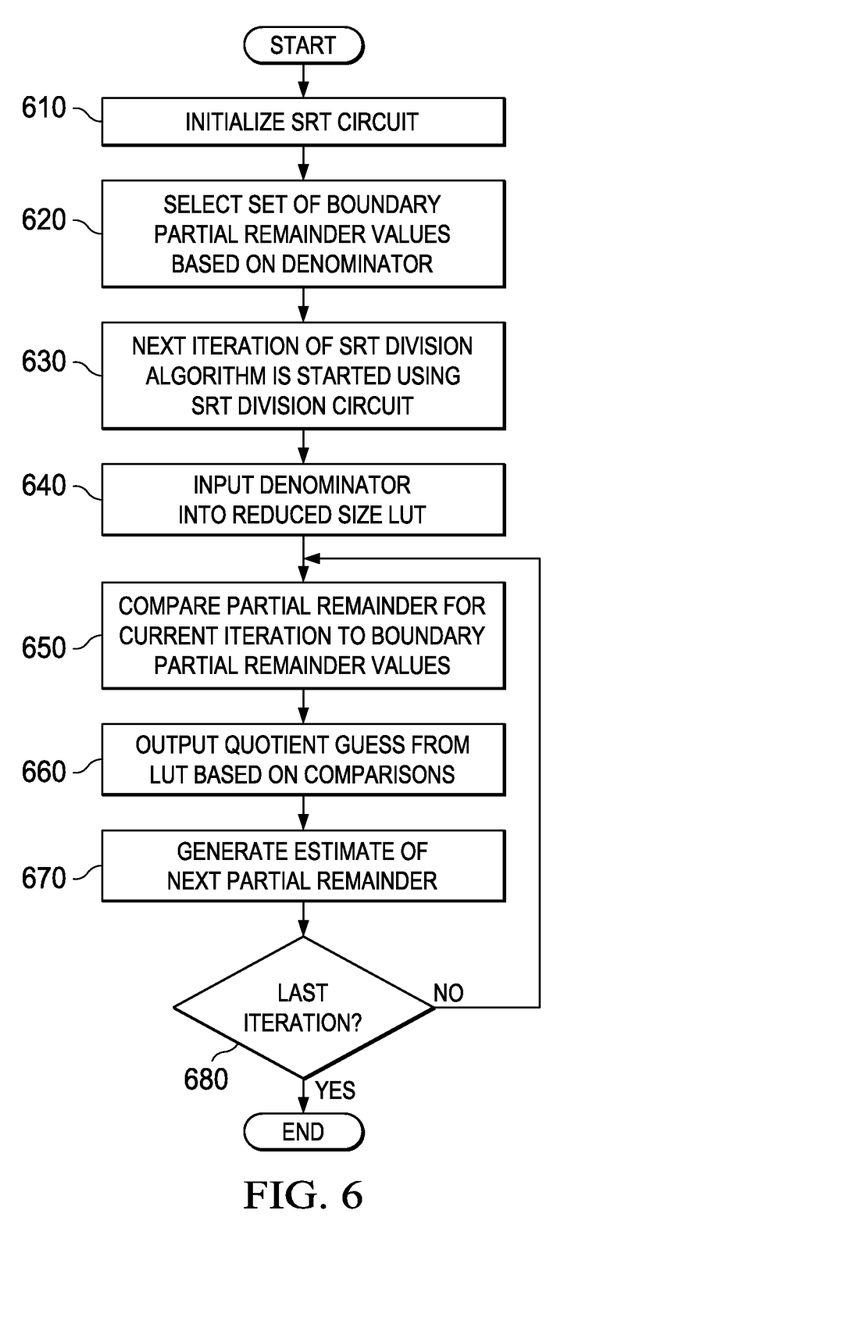
FIG. 6 is an example flowchart outlining an example operation for utilizing a reduced size LUT mechanism in accordance with one illustrative embodiment.

FIG. 6 is an example flowchart outlining an example operation for utilizing a reduced size LUT mechanism in accordance with one illustrative embodiment. As shown in FIG. 6, the operation starts by initializing the SRT circuit (step 610). The initialization includes setting the value for the constant denominator D. The denominator D is used to select a set of boundary partial remainder values (step 620). This is done once per division operation since the D value is a constant denominator value and does not change during the SRT division operation, and thus the boundary partial remainder values will not change.

A next iteration, which immediately after initialization is the first iteration, of the SRT division algorithm is started using the SRT division circuit element (step 630). The constant denominator D is input to the lookup table mechanism of the illustrative embodiment to determine a column of the lookup table mechanism to utilize (step 640). The current partial remainder P(i) is input to the lookup table mechanism to be compared to the selected boundary partial remainders (step 650). Based on the comparison, a quotient guess q(i+1) is output from the LUT mechanism (step 660). A product of the quotient guess q(i+1) and the denominator D is generated and used along with the partial remainder P(i) for the current iteration to generate an estimate for the next partial remainder P(i+1) (step 670).

A determination is made as to whether a last iteration has been encountered (step 680). If so, the operation terminates. Otherwise, the operation returns to step 650 where the next iteration is performed using the estimated partial remainder P(i+1) as the partial remainder P(i) for the current iteration. The result of this operation is the quotient of dividend by divisor which is calculated in the SRT algorithm by accumulating the quotient digits q(i+1), i.e. Final Q=sum{q(i+1)*r^−(i+1)}.

Thus, the illustrative embodiment provides mechanisms for utilizing a reduced size lookup table circuit. The reduced size lookup table circuit stores only the boundary cell values for sets or columns of the lookup table. As a result, the lookup table circuit requires less chip area, operates more quickly, and uses less power than known lookup table mechanisms.

The mechanisms of the illustrative embodiments may be implemented in circuitry of any execution unit dealing with arithmetic operations. For example, the illustrative embodiments may be implemented in a processor, co-processor, a floating point unit, a fixed point unit, or any other type of arithmetic unit of a data processing device.

The circuit illustrative embodiments as described above may be provided as part of the design for an integrated circuit chip. The chip design may be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design may then be converted into the appropriate format (e.g., GDSII) for the fabrication of photolithographic masks, which typically include multiple copies of the chip design in question that are to be formed on a wafer. The photolithographic masks may be utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor. Moreover, the end products in which the integrated circuit chips may be provided may include game machines, game consoles, hand-held computing devices, personal digital assistants, communication devices, such as wireless telephones and the like, laptop computing devices, desktop computing devices, server computing devices, or any other computing device.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a computer readable storage medium having a computer readable program stored therein, wherein the computer readable program, when executed on a computing device, causes the computing device to:

input a first input value to the reduced lookup table circuit for selecting a subset of values from the reduced lookup table circuit, wherein the reduced lookup table circuit stores only boundary cell values from a fully filled lookup table corresponding to the reduced lookup table circuit, and wherein the subset of values comprises only a subset of boundary cell values corresponding to the first input value;

input a second value to the reduced lookup table circuit;

compare, by the reduced lookup table circuit, the second value to each of the boundary cell values in the subset of boundary cell values; and output, by the reduced lookup table circuit, an output value based on results of the comparison of the second value to each of the boundary cell values in the subset of boundary cell values.

2. The computer program product of claim 1, wherein the operation is a SRT operation.

3. The computer program product of claim 2, wherein the first input value is a denominator value D that is constant for the SRT operation.

4. The computer program product of claim 3, wherein the second value is a partial remainder for a current iteration of the SRT operation.

5. The computer program product of claim 2, wherein the output value is a quotient guess value for the SRT operation.

6. The computer program product of claim 5, wherein the computer readable program further causes the computing device to:

perform the input of the first input value to the reduced lookup table circuit, input of the second value to the reduced lookup table circuit, compare of the second value to each of the boundary cell values, and output of the output value for a plurality of iterations of the SRT division operation; and accumulate quotient guess values for the plurality of iterations to obtain a final result value.

7. The computer program product of claim 6, wherein a quotient guess value for a current iteration is used to calculate a partial remainder value of a next iteration in the plurality of iterations.

8. An apparatus, comprising:
- a reduced lookup table circuit that stores only boundary cell values from a fully filled lookup table corresponding to the reduced lookup table circuit; and
- at least one comparator coupled to the reduced lookup table circuit, wherein:
  - a first input value is input to the reduced lookup table circuit for selecting a subset of values from the reduced lookup table circuit, wherein the subset of values comprises only a subset of boundary cell values corresponding to the first input value;
  - a second value is input to the reduced lookup table circuit;
  - the comparator compares the second value to each of the boundary cell values in the subset of boundary cell values; and
  - an output value is output based on results of the comparison of the second value to each of the boundary cell values in the subset of boundary cell values.

9. The apparatus of claim 8, wherein the operation is a SRT operation.

10. The apparatus of claim 9, wherein the first input value is a denominator value D that is constant for the SRT division operation.

11. The apparatus of claim 10, wherein the second value is a partial remainder for a current iteration of the SRT operation.

12. The apparatus of claim 8, wherein the output value is a quotient guess value for the SRT operation.

13. The apparatus of claim 12, wherein the input of the first input value to the reduced lookup table circuit, input of the second value to the reduced lookup table circuit, compare of the second value to each of the boundary cell values, and output of the output value are performed for a plurality of iterations of the SRT division operation, and wherein quotient guess values for the plurality of iterations are accumulated by the SRT operation to obtain a final result value.

14. The apparatus of claim 13, wherein a quotient guess value for a current iteration is used to calculate a partial remainder value of a next iteration in the plurality of iterations.

15. The apparatus of claim 8, wherein the apparatus is a logic circuit of a data processing system configured to execute a SRT division algorithm.

* * * * *